United States Patent [19]
Yamakawa

[11] Patent Number: 5,311,348
[45] Date of Patent: May 10, 1994

[54] CYLINDRICAL LENS SYSTEM FOR USE IN LASER BEAM SCANNING APPARATUS AND SCANNING APPARATUS INCLUDING SAME

[75] Inventor: Kazuo Yamakawa, Osaka, Japan

[73] Assignee: Minolta Camera Kabushiki Kaisha, Osaka, Japan

[21] Appl. No.: 967,822

[22] Filed: Oct. 28, 1992

[30] Foreign Application Priority Data
Oct. 31, 1991 [JP] Japan .................. 3-313411

[51] Int. Cl.⁵ .................................. G02B 26/08
[52] U.S. Cl. .................. 359/216; 359/784; 359/196
[58] Field of Search .......... 359/216, 217, 218, 219, 359/205, 206, 204, 784, 785, 786, 196

[56] References Cited

U.S. PATENT DOCUMENTS

| | | | |
|---|---|---|---|
| 3,944,337 | 3/1976 | Ruben | 359/785 |
| 4,620,775 | 11/1986 | Fujioka | 359/785 |
| 4,963,900 | 10/1990 | Budd et al. | 346/160 |
| 5,048,028 | 9/1991 | Makino et al. | 372/24 |
| 5,146,360 | 9/1992 | Yamakawa | 359/216 |
| 5,173,809 | 12/1992 | Iwaki et al. | 359/784 |

*Primary Examiner*—Loha Ben
*Attorney, Agent, or Firm*—Price, Gess & Ubell

[57] ABSTRACT

A cylindrical lens system is provided with a first element including a first cylindrical lens having a convex surface and a second cylindrical lens having a concave surface. The convex surface and the concave surface are arranged to be opposite to each other. The cylindrical lens system is also provided with a second element including a third cylindrical lens.

27 Claims, 8 Drawing Sheets

CYLINDRICAL LENS SYSTEM FOR USE IN LASER BEAM SCANNING APPARATUS AND SCANNING APPARATUS INCLUDING SAME

BACKGROUND OF THE INVENTION

1. Field of the Invention

The present invention relates to a cylindrical lens system, and more particularly, to a cylindrical lens system for use in a laser beam scanning apparatus.

2. Description of the Prior Art

A laser beam scanning apparatus is generally provided with a rotating polygonal mirror for deflecting a laser beam. Moreover, a laser beam scanning apparatus is known which is provided with a cylindrical lens system for converging a laser beam into a linear form on a reflecting surface of a polygonal mirror in order to correct an inclination of the reflecting surface of the polygonal mirror. In such a laser beam scanning apparatus, a laser beam is converged on the reflecting surface of the polygonal mirror with respect to a direction perpendicular to a scanning surface. The scanning surface means a surface formed by a time-series congregation of the beams deflected by the polygonal mirror. The reflecting surface of the polygonal mirror and a scanned object are in a substantially conjugate relation with respect to a lens system therebetween in the direction perpendicular to the scanning surface. As a result, even if the reflecting surface of the polygonal mirror is inclined, an incident position of a laser beam on the scanned object never shifts.

When a semiconductor laser is used as a beam source, the oscillation wavelength varies according to changes in an environmental condition such as temperature. Moreover, a laser scanning apparatus is known where a plurality of laser beams having different wavelengths are used. In these cases, it is required to correct chromatic aberration generated due to variation or difference in wavelength. This correction is necessary particularly when the spot diameter on a scanned object is small, since the spot diameter is apt to vary due to chromatic aberration.

In an optical system for use in a laser beam scanning apparatus, a collimator lens and an fθ lens are known where chromatic aberration is corrected. Cylindrical lens systems including a plurality of lens elements are disclosed by U.S. Pat. No. 4,963,900 and U.S. Pat. No. 5,048,028 (corresponding to Japanese laid-open Patent Application H3-154018).

SUMMARY OF THE INVENTION

An object of the present invention is to provide a cylindrical lens system with which a desired chromatic aberration can be obtained while various aberrations are maintained in an excellent condition.

Another object of the present invention is to provide a highly accurate cylindrical lens system which is easily processed.

Still another object of the present invention is to provide a laser beam scanning apparatus where various aberrations are excellently corrected.

To achieve the above-mentioned objects, a cylindrical lens system according to the present invention is provided with a first element including a first cylindrical lens having a convex surface and a second cylindrical lens having a concave surface, which convex and concave surfaces are arranged to be opposite to each other, and a second element including a third cylindrical lens.

BRIEF DESCRIPTION OF THE DRAWINGS

These and other objects and features of this invention will become clear from the following description, taken in conjunction with the preferred embodiments with reference to the accompanied drawings in which.

DESCRIPTION OF THE PREFERRED EMBODIMENTS

Figure 15:
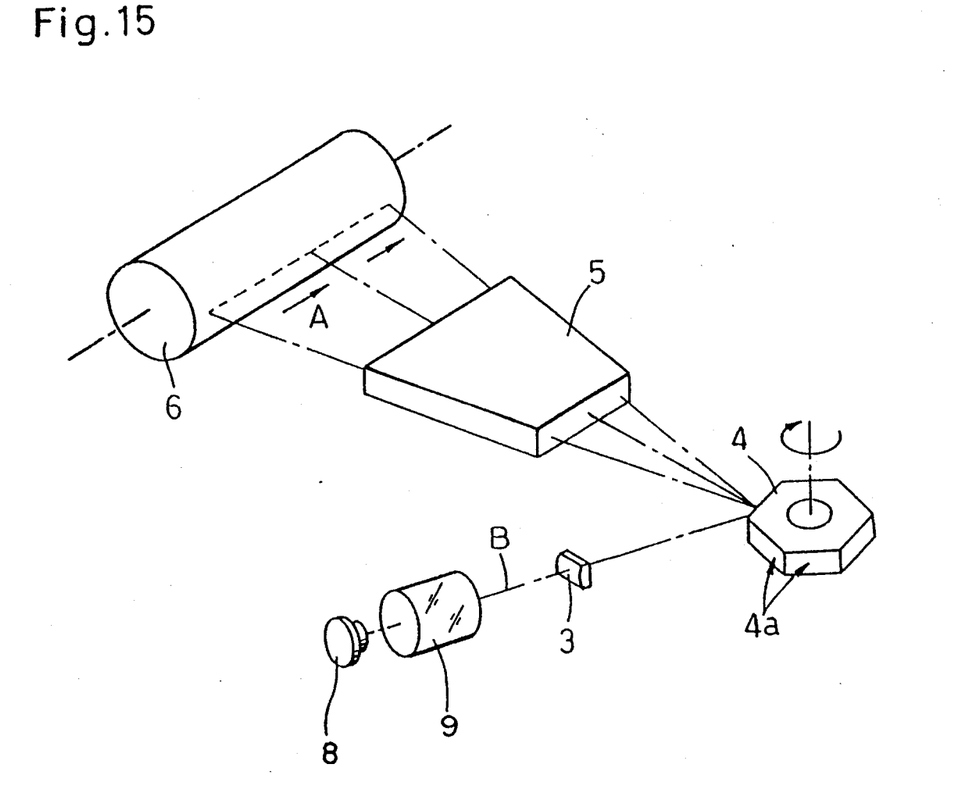
FIG. 15 is a perspective view showing an arrangement of an optical system of a laser beam scanning apparatus to which a cylindrical lens of the present invention is incorporated.

FIG. 15 is a perspective view showing an arrangement of an optical system of a laser beam scanning apparatus embodying the present invention. The optical system of the laser scanning apparatus includes a semiconductor laser 8 which serves as a beam source, a collimator lens 9, a cylindrical lens 3, a polygonal mirror 4, an fθ lens 5 and a photoreceptor drum 6.

The semiconductor laser 8 emits a laser beam B which is directly modulated based on image information. The laser beam B which is an example of a bundle of rays is transformed into a parallel bundle of rays through the collimator lens 9. Thereafter, the laser beam B is converged into a linear form through the cylindrical lens 3, and is formed into an image on a deflecting reflection point 4a of the polygonal mirror 4 which is an example of a deflector. After being reflected at the deflecting reflection point 4a, the laser beam B is deflected as the polygonal mirror 4 rotates. Then, the laser beam B is formed into an image through the toric fθ lens 5 which is an example of a scanning optical system on the photoreceptor drum 6 which is an example of a scanned object. The laser beam scans in a direction of arrow A.

The above-described arrangement constitutes an image inclination correcting optical system, where an inclination error of a deflecting reflection surface of a deflector is corrected by arranging the deflecting reflection surface and a scanned object so as to be in a substantially conjugate relation in a direction perpendicular to a scanned surface.

It should be noted that, in the present specification, a scanned surface means a surface formed by a time-series congregation of a bundle of rays to be scanned, that is, the surface including a main scanning line on a scanned object and an optical axis of a scanning optical system.

Figure 16:
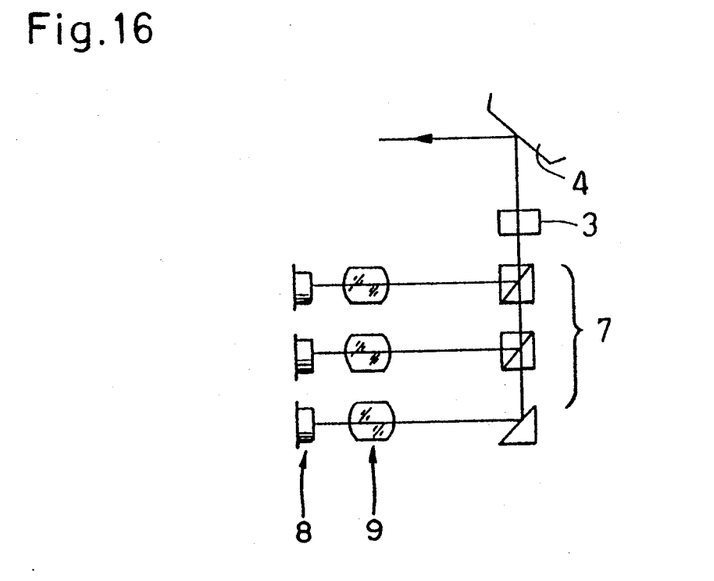
FIG. 16 is a perspective view showing an arrangement of an optical system of a laser beam scanning apparatus where a plurality of laser beams having different wavelengths are used.

In a case where a plurality of laser beams having different wavelengths are used, an optical system shown in FIG. 16 may be used. In FIG. 16, constituents the same as those of FIG. 15 are denoted by the same reference designations. Numeral 7 is a beam compounding means.

Figure 1:
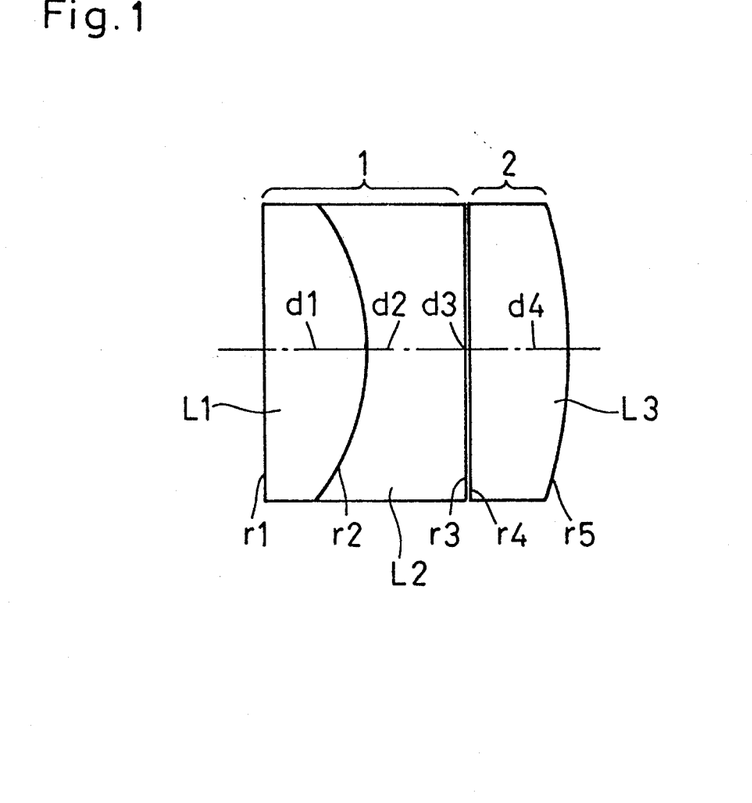
FIG. 1 is a cross-sectional view showing a lens arrangement of first and second embodiments of the present invention.
Figure 2:
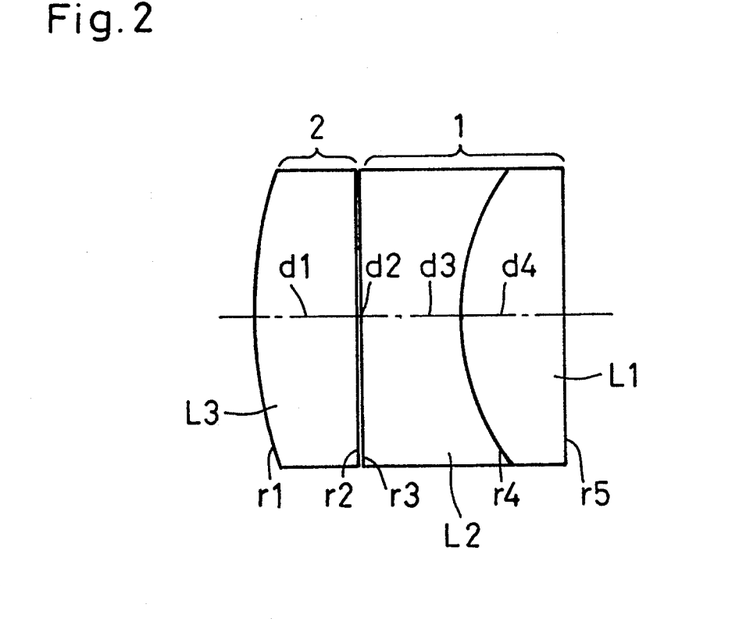
FIG. 2 is a cross-sectional view showing a lens arrangement of third and fourth embodiments of the present invention.
Figure 3:
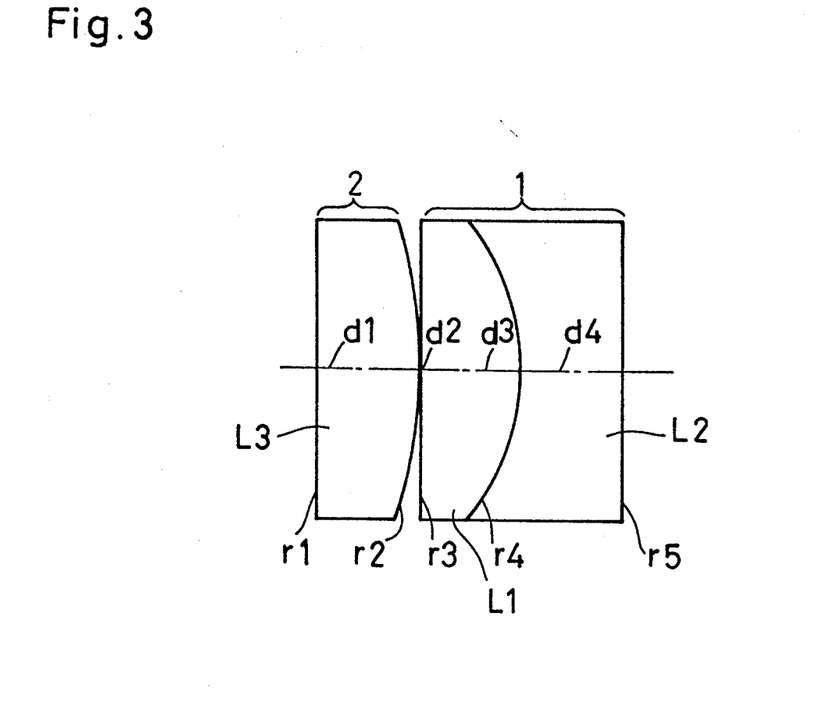
FIG. 3 is a cross-sectional view showing a lens arrangement of a fifth embodiment of the present invention.
Figure 4:
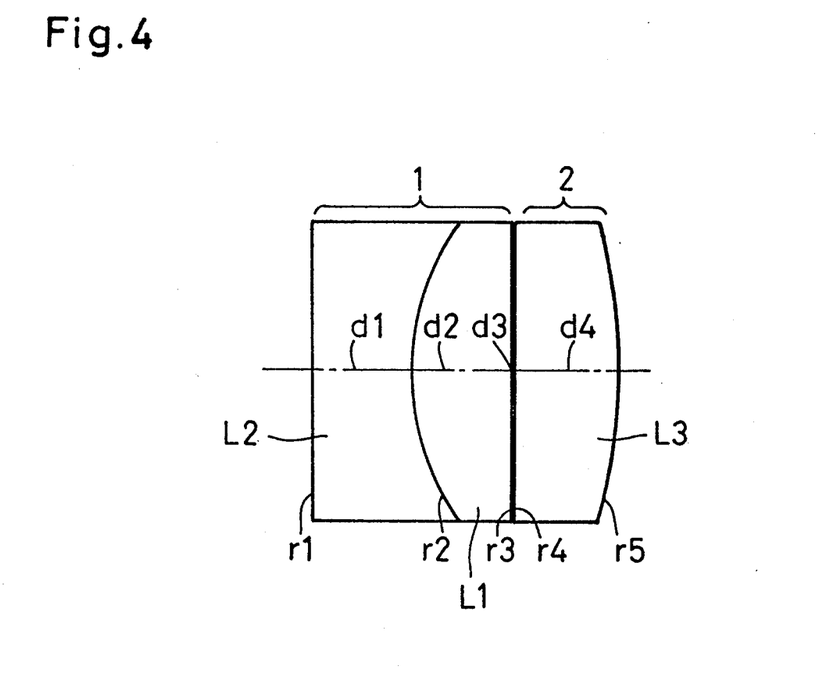
FIG. 4 is a cross-sectional view showing a lens arrangement of a sixth embodiment of the present invention.
Figure 5:
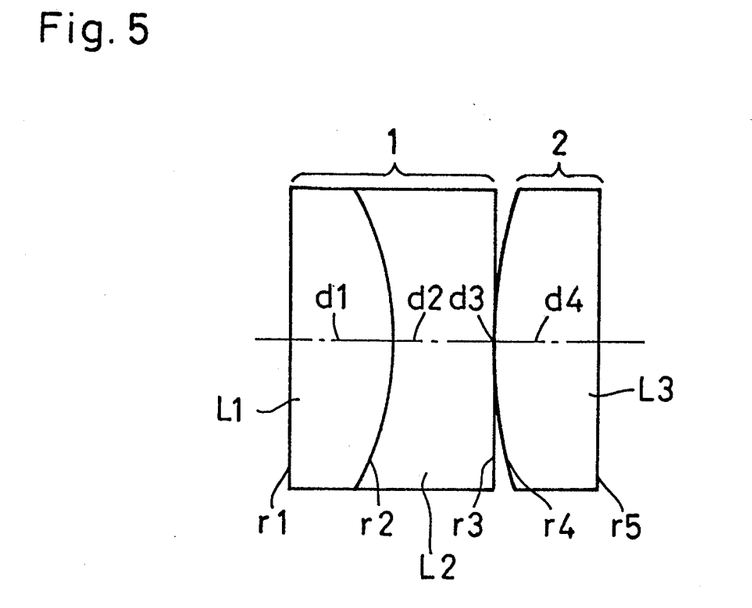
FIG. 5 is a cross-sectional view showing a lens arrangement of a seventh embodiment of the present invention.
Figure 6:
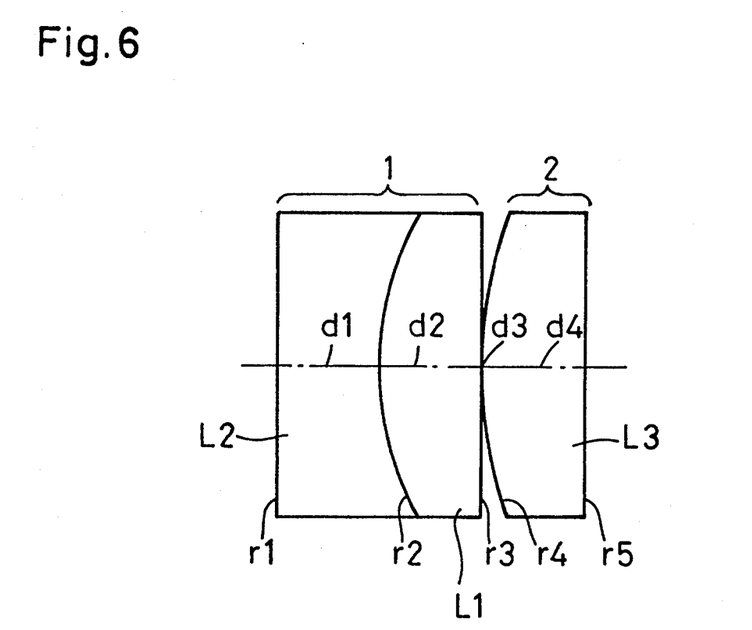
FIG. 6 is a cross-sectional view showing a lens arrangement of an eighth embodiment of the present invention.
Figure 7:
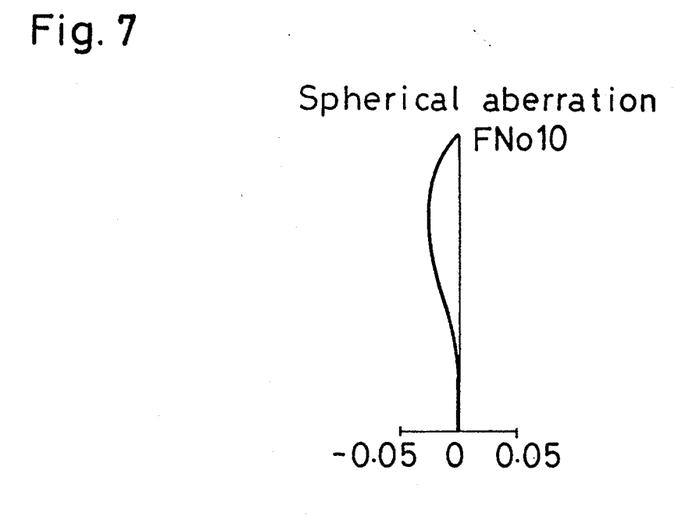
FIG. 7 is a graphic representation of spherical aberration of the first embodiment of the present invention.
Figure 8:
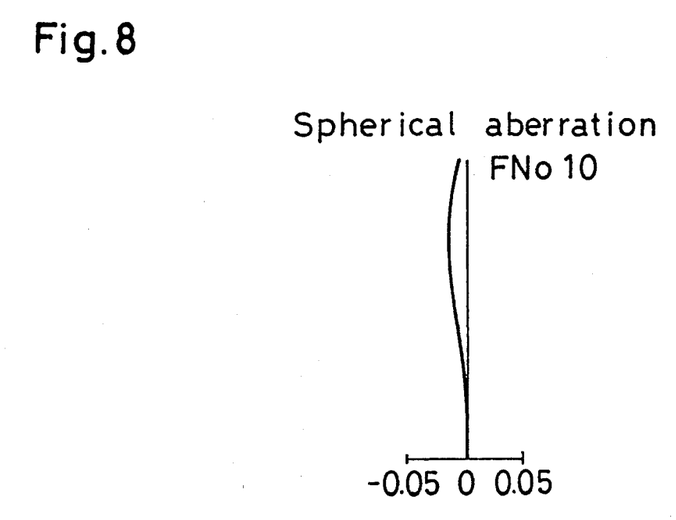
FIG. 8 is a graphic representation of spherical aberration of the second embodiment of the present invention.
Figure 9:
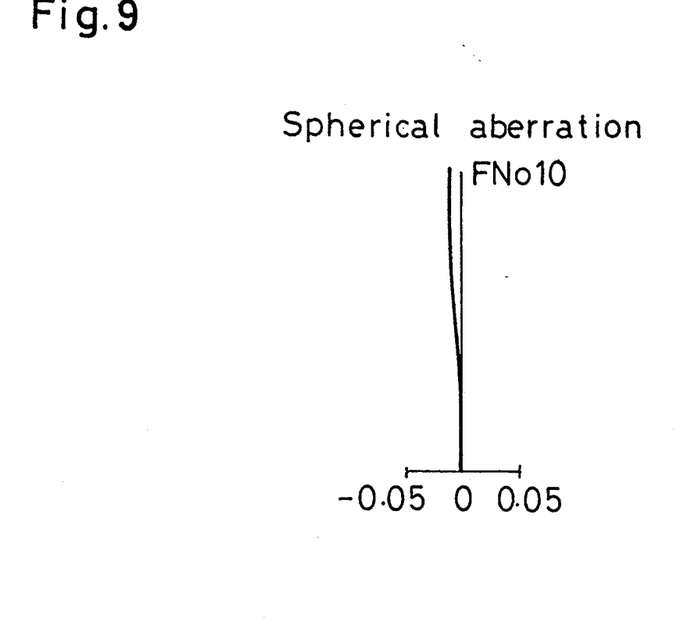
FIG. 9 is a graphic representation of spherical aberration of the third embodiment of the present invention.
Figure 10:
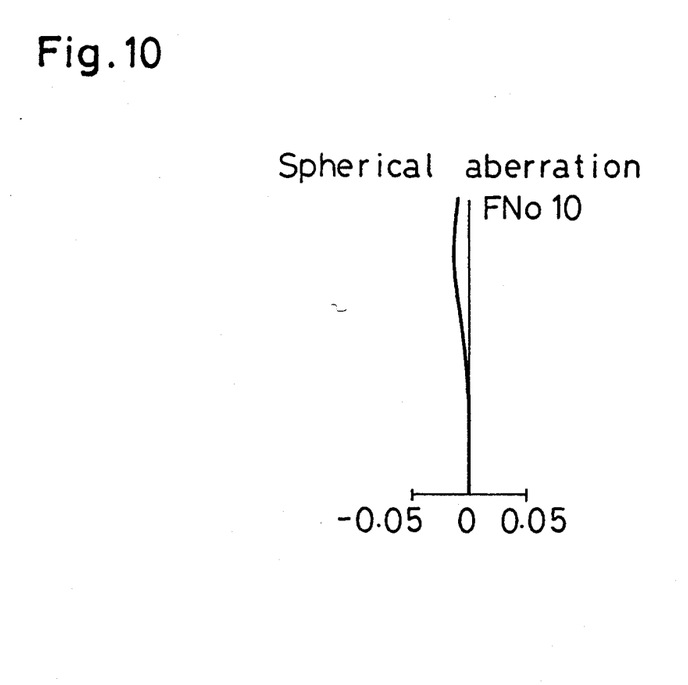
FIG. 10 is a graphic representation of spherical aberration of the fourth embodiment of the present invention.
Figure 11:
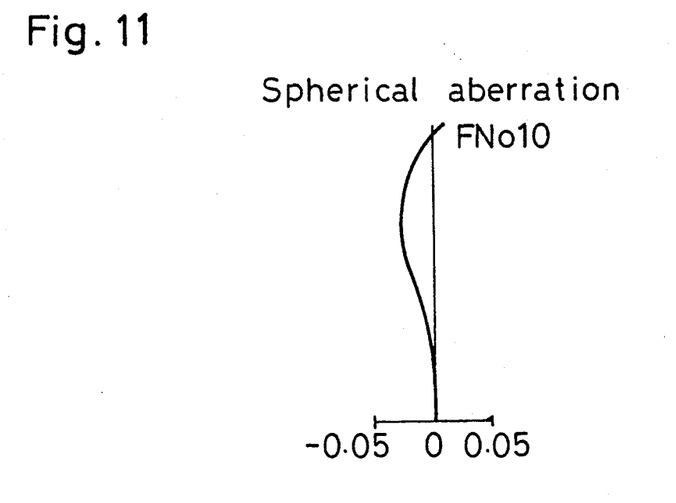
FIG. 11 is a graphic representation of spherical aberration of the fifth embodiment of the present invention.
Figure 12:
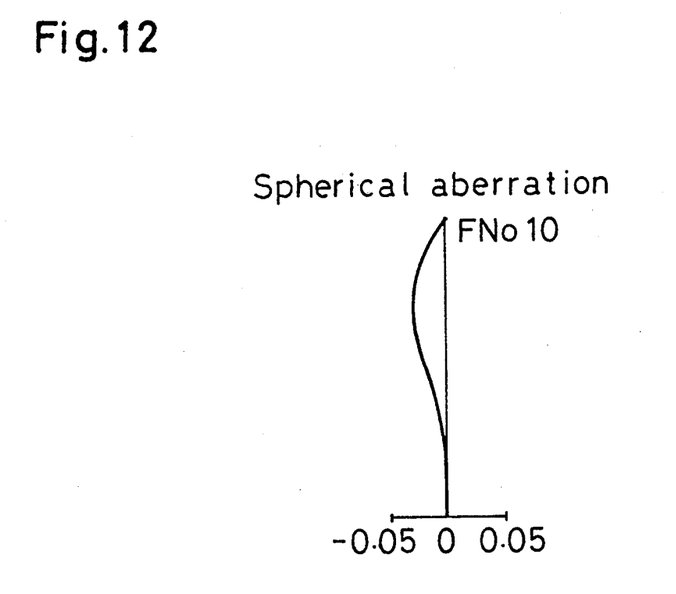
FIG. 12 is a graphic representation of spherical aberration of the sixth embodiment of the present invention.
Figure 13:
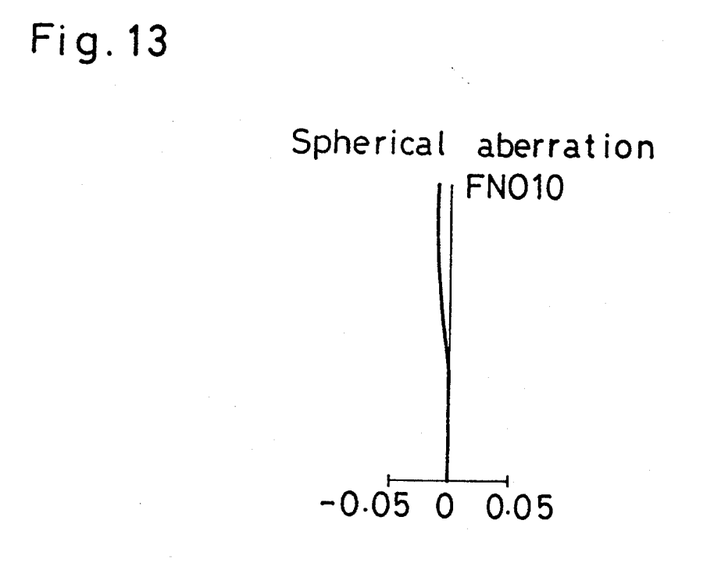
FIG. 13 is a graphic representation of spherical aberration of the seventh embodiment of the present invention.
Figure 14:
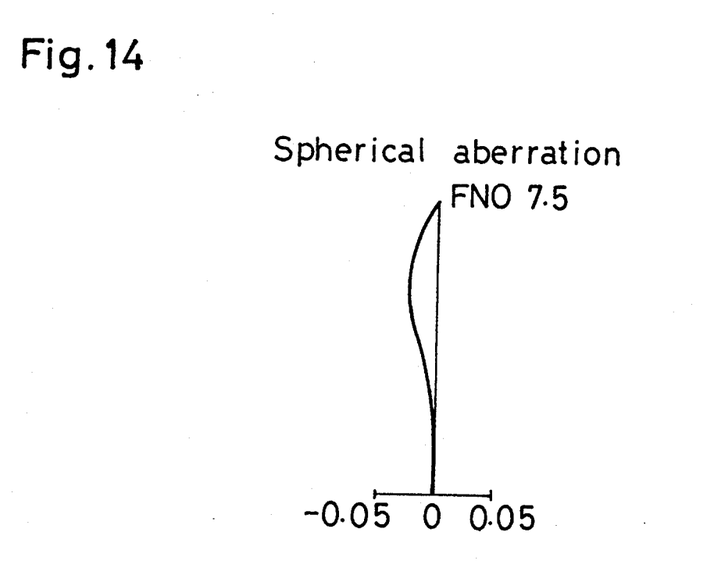
FIG. 14 is a graphic representation of spherical aberration of the eighth embodiment of the present invention.

FIGS. 1 to 6 show lens arrangements of cylindrical lens systems which are first to eighth embodiments of the present invention. FIG. 1 shows a lens arrangement of the first and second embodiments. FIG. 2 shows a lens arrangement of the third and fourth embodiments. FIGS. 3 to 6 show lens arrangements of the fifth to eighth embodiments, respectively.

In an embodiment of the present invention, a cylindrical lens system is provided with a first element 1 including a convex cylindrical lens L1 having a convex surface with a curvature larger than that of its reverse surface and a concave cylindrical lens L2 having a concave surface with a curvature larger than that of its reverse surface, and a second element 2 including a convex cylindrical lens L3.

The cylindrical lens system can be provided between the laser beam source 8 and the deflector 4 for converging a laser beam emitted by the laser beam source 8 on the reflecting surface of the deflector 4. The cylindrical lens system includes a first element including a first cylindrical lens L1 having a convex surface and a second cylindrical lens L2 having a concave surface, the convex surface and the concave surface being arranged to be opposite to each other, and a second element including a third cylindrical lens L3.

In the first element 1 where the larger-curvature convex surface of the convex cylindrical lens L1 and the larger-curvature concave surface of the concave cylindrical lens L2 are arranged to be opposite to each other, an appropriate chromatic aberration can be generated by appropriately selecting refractive indices and dispersion of the convex cylindrical lens L1 and the concave cylindrical lens L2. Further, by causing the convex cylindrical lens L3 of the second element 2 to work in cooperation with the first element 1, a desired chromatic aberration can be obtained while various aberrations (chiefly spherical aberration) are maintained in an excellent condition.

The surface reverse to the larger-curvature convex surface of the convex cylindrical lens L1 and the surface reverse to the larger-curvature concave surface of the concave cylindrical lens L2 in the first element 1 are flat surfaces. By using those reverse surfaces as reference surfaces, the processing of the convex and concave cylindrical lenses L1 and L2 is facilitated. Moreover, the processing accuracy and the arrangement setting accuracy are improved.

For the same reason, it is desirable that one surface of the convex cylindrical lens L3 of the second element 2 be a flat surface. Moreover, by cementing the larger-curvature convex surface of the convex cylindrical lens L1 and the larger-curvature concave surface of the concave cylindrical lens L2 which concave surface is opposite to the larger-curvature convex surface of the convex cylindrical lens L1 in the first element 1 and by cementing one surface of the first element 1 and one surface of the second element 2 which surface is opposite to the one surface of the first element 1, a supporting mechanism of the cylindrical lens system is simplified.

Further, it is desirable that the following condition be satisfied:

$$0.4 < f_2/f < 1 \tag{1}$$

where f is a focal length of the entire cylindrical lens system in a direction in which the lens system has refractive power and $f_2$ is a focal length of the second element 2 in a direction in which the second element 2 has refractive power.

When the lower limit of the condition (1) is exceeded, although the generation amount of chromatic aberration increases in a direction opposite to a direction in which chromatic aberration is generated in an fθ lens, various aberrations such as spherical aberration deteriorate. When the upper limit of the condition (1) is exceeded, although various aberrations other than chromatic aberration are maintained in an excellent condition, the generation amount of chromatic aberration is extremely small. As a result, a desired amount of chromatic aberration cannot be obtained.

Numerical data of the first to eighth embodiments are shown in Tables 1 to 8. In the tables and drawings, r1 to r5 are radii of curvatures of respective surfaces (radii of curvatures in a direction perpendicular to the direction in which the lens system has refractive power are all infinity), and d1 to d4 are axial distances. In the tables, f is a focal length of the entire lens system in a direction in which the lens system has refractive power, FNo is an F number in the direction in which the lens system has refractive power, n1 to n3 are refractive indices, of glass materials of which respective lenses are made, with respect to a light beam with a wavelength of 830 nm, ν1 to ν3 are Abbe numbers of glass materials of which respective lenses are made, $f_2$ is a focal length of the second element in a direction in which the second element has refractive power, ΔBF is a difference between a focal point position with respect to a laser beam having a wavelength of 830 nm and a focal point position with respect to a laser beam having a wavelength of 780 nm in the entire lens system, and the first element and a second element are denoted by 1 and 2, respectively. FIGS. 7 to 14 are graphic representations of spherical aberrations of the first to eighth embodiments.

TABLE 1

<Embodiment 1>  f = 67, FNo = 10

| | | Cylindrical Radius of Curvature | | Axial Distance | Refractive Index (830 nm) | | Abbe Number | |
|---|---|---|---|---|---|---|---|---|
| 1 | { | r1 | ∞ | d1 5.0 | n1 1.61217 | υ1 | 60.3 | |
|   |   | r2 | −10.526 | d2 5.0 | n2 1.69975 | υ2 | 29.4 | |
|   |   | r3 | ∞ | d3 0.0 | | | | |
| 2 | { | r4 | ∞ | d4 5.0 | n3 1.51020 | υ3 | 64.1 | |
|   |   | r5 | −23.090 | | | | | | f2 = 45.3, f2/f = 0.676, ΔBF = 0.279

TABLE 2

<Embodiment 2>  f = 67, FNo = 10

| | | Cylindrical Radius of Curvature | | Axial Distance | Refractive Index (830 nm) | | Abbe Number |
|---|---|---|---|---|---|---|---|
| 1 | { | r1 | 183.0 | d1 5.0 | n1 1.61217 | υ1 | 60.3 |
|   |   | r2 | −12.656 | d2 5.0 | n2 1.69975 | υ2 | 29.4 |
|   |   | r3 | ∞ | d3 0.0 | | | |
| 2 | { | r4 | ∞ | d4 5.0 | n3 1.51020 | υ3 | 64.1 |
|   |   | r5 | −20.005 | | | | | f2 = 54.9, f2/f = 0.819, ΔBF = 0.208

TABLE 3

<Embodiment 3>  f = 66, FNo = 10

| | | Cylindrical Radius of Curvature | | Axial Distance | Refractive Index (830 nm) | | Abbe Number |
|---|---|---|---|---|---|---|---|
| 2 | { | r1 | 20.360 | d1 5.0 | n1 1.51020 | υ1 | 64.1 |
|   |   | r2 | ∞ | d2 0.1 | | | |
| 1 | { | r3 | ∞ | d3 5.0 | n2 1.72121 | υ2 | 28.3 |
|   |   | r4 | 10.712 | d4 5.0 | n3 1.59514 | υ3 | 60.7 |
|   |   | r5 | ∞ | | | | | f2 = 39.9, f2/f = 0.605, ΔBF = 0.192

TABLE 4

<Embodiment 4>  f = 66, FNo = 10

| | | Cylindrical Radius of Curvature | | Axial Distance | Refractive Index (830 nm) | | Abbe Number |
|---|---|---|---|---|---|---|---|
| 2 | { | r1 | 17.356 | d1 5.0 | n1 1.51020 | υ1 | 64.1 |
|   |   | r2 | ∞ | d2 0.0 | | | |
| 1 | { | r3 | ∞ | d3 5.0 | n2 1.78278 | υ2 | 25.4 |
|   |   | r4 | 9.824 | d4 5.0 | n3 1.61217 | υ3 | 60.3 |
|   |   | r5 | ∞ | | | | | f2 = 34.0, f2/f = 0.515, ΔBF = 0.301

TABLE 5

<Embodiment 5>  f = 68, FNo = 10

| | | Cylindrical Radius of Curvature | | Axial Distance | Refractive Index (830 nm) | | Abbe Number |
|---|---|---|---|---|---|---|---|
| 2 | { | r1 | ∞ | d1 5.0 | n1 1.51020 | υ1 | 64.1 |
|   |   | r2 | −22.719 | d2 0.1 | | | |
| 1 | { | r3 | ∞ | d3 5.0 | n2 1.61217 | υ2 | 60.3 |
|   |   | r4 | 10.486 | d4 5.0 | n3 1.69975 | υ3 | 29.4 |
|   |   | r5 | ∞ | | | | | f2 = 44.5, f2/f = 0.654, ΔBF = 0.248

TABLE 6

<Embodiment 6>  f = 67, FNo = 10

| | | Cylindrical Radius of Curvature | | Axial Distance | Refractive Index (830 nm) | | Abbe Number |
|---|---|---|---|---|---|---|---|
| 1 | { | r1 | ∞ | d1 5.0 | n1 1.69975 | υ1 | 29.4 |
|   |   | r2 | 11.599 | d2 5.0 | n2 1.61217 | υ2 | 60.3 |
|   |   | r3 | ∞ | d3 0.1 | | | |
| 2 | { | r4 | ∞ | d4 5.0 | n3 1.51020 | υ3 | 64.1 |

TABLE 6-continued

<Embodiment 6>  f = 67, FNo = 10

| Cylindrical Radius of Curvature | | Axial Distance | Refractive Index (830 nm) | Abbe Number |
|---|---|---|---|---|
| r5 | −23.816 | | | | f2 = 46.7, f2/f = 0.697, ΔBF = 0.241

TABLE 7

<Embodiment 7>  f = 67, FNo = 10

| | | Cylindrical Radius of Curvature | | Axial Distance | Refractive Index (830 nm) | | Abbe Number |
|---|---|---|---|---|---|---|---|
| 1 | { | r1 | ∞ | d1 5.0 | n1 1.61217 | υ1 | 60.3 |
|   |   | r2 | −13.521 | d2 5.0 | n2 1.69975 | υ2 | 29.4 |
|   |   | r3 | ∞ | d3 0.1 | | | |
| 2 | { | r4 | 24.308 | d4 5.0 | n3 1.51020 | υ3 | 64.1 |
|   |   | r5 | ∞ | | | | | f2 = 47.6, f2/f = 0.710, ΔBF = 0.195

TABLE 8

<Embodiment 8>  f = 67, FNo = 10

| | | Cylindrical Radius of Curvature | | Axial Distance | Refractive Index (830 nm) | | Abbe Number |
|---|---|---|---|---|---|---|---|
| 1 | { | r1 | ∞ | d1 5.0 | n1 1.78278 | υ1 | 25.4 |
|   |   | r2 | 13.207 | d2 5.0 | n2 1.61217 | υ2 | 60.3 |
|   |   | r3 | ∞ | d3 0.1 | | | |
| 2 | { | r4 | 19.082 | d4 5.0 | n3 1.51020 | υ3 | 64.1 |
|   |   | r5 | ∞ | | | | | f2 = 37.4, f2/f = 0.558, ΔBF = 0.345

Obviously, many modifications and variations of the present invention are possible in light of the above teachings. It is therefore to be understood that within the scope of the appended claims, the invention may be practiced other than as specifically described.

What is claimed is:

1. A cylindrical lens system comprising:
   a first element including a first cylindrical lens having a convex surface and a second cylindrical lens having a concave surface, the convex surface and the concave surface being arranged to be opposite to each other; and
   a second element including a third cylindrical lens,
   wherein radii of curvature of the respective surfaces of said first, second, and third cylindrical lenses in a direction perpendicular to a direction in which said first, second, and third cylindrical lenses have refractive power are all infinity.

2. A cylindrical lens system as claimed in claim 1, wherein the third cylindrical lens is a convex cylindrical lens.

3. A cylindrical lens system as claimed in claim 1, wherein one surface of the third cylindrical lens is a flat surface.

4. A cylindrical lens system as claimed in claim 1, wherein the convex surface of the first cylindrical lens and the concave surface of the second cylindrical lens are cemented.

5. A cylindrical lens system as claimed in claim 1, wherein one surface of the first element and one surface of the second element which surface is opposite to the one surface of the first element are cemented.

6. A cylindrical lens system comprising:
   a first element including a first cylindrical lens having a convex surface and a second cylindrical lens having a concave surface, the convex surface and the concave surface being arranged to be opposite to each other; and a second element including a third cylindrical lens, wherein, in the first cylindrical lens, a surface reverse to the convex surface is a flat surface.

7. A cylindrical lens system comprising:

a first element including a first cylindrical lens having a convex surface and a second cylindrical lens having a concave surface, the convex surface and the concave surface being arranged to be opposite to each other; and a second element including a third cylindrical lens, wherein, in the first cylindrical lens, a surface reverse to the concave surface is a flat surface.

8. A cylindrical lens system comprising:

a first element including a first cylindrical lens having a convex surface and a second cylindrical lens having a concave surface, the convex surface and the concave surface being arranged to be opposite to each other; and a second element including a third cylindrical lens, wherein the following condition is satisfied:

$$0.4 < f_2/f < 1$$

where f is a focal length of the entire lens system in a direction in which the lens system has refractive power and $f_2$ is a focal length of the second element in a direction in which the second element has refractive power.

9. A cylindrical lens system comprising:

a first element including a first cylindrical lens having a convex surface with a curvature larger than that of its reverse surface and a second cylindrical lens having a concave surface with a curvature larger than that of its reverse surface, the convex surface of the first cylindrical lens and the concave surface of the second cylindrical lens being arranged to be opposite to each other; and a second element including a third cylindrical lens having a positive refractive power, wherein radii of curvature of the respective surfaces of said first, second, and third cylindrical lenses in a direction perpendicular to a direction in which said first, second, and third cylindrical lenses have refractive power are all infinity.

10. A cylindrical lens system as claimed in claim 9, wherein one surface of the third cylindrical lens is a flat surface.

11. A cylindrical lens system as claimed in claim 9, wherein the convex surface of the first cylindrical lens and the concave surface of the second cylindrical lens are cemented.

12. A cylindrical lens system as claimed in claim 9, wherein one surface of the first element and one surface of the second element which surface is opposite to the one surface of the first element are cemented.

13. A cylindrical lens system comprising:

a first element including a first cylindrical lens having a convex surface with a curvature larger than that of its reverse surface and a second cylindrical lens having a concave surface with a curvature larger than that of its reverse surface, the convex surface of the first cylindrical lens and the concave surface of the second cylindrical lens being arranged to be opposite to each other; and a second element including a third cylindrical lens having a positive refractive power.

wherein, in the first cylindrical lens, a surface reverse to the convex surface is a flat surface.

14. A cylindrical lens system comprising:

a first element including a first cylindrical lens having a convex surface with a curvature larger than that of its reverse surface and a second cylindrical lens having a concave surface with a curvature larger than that of its reverse surface, the convex surface of the first cylindrical lens and the concave surface of the second cylindrical lens being arranged to be opposite to each other; and a second element including a third cylindrical lens having a positive refractive power.

wherein, in the first cylindrical lens, a surface reverse to the concave surface is a flat surface.

15. A cylindrical lens system comprising:

a first element including a first cylindrical lens having a convex surface with a curvature larger than that of its reverse surface and a second cylindrical lens having a concave surface with a curvature larger than that of its reverse surface, the convex surface of the first cylindrical lens and the concave surface of the second cylindrical lens being arranged to be opposite to each other; and a second element including a third cylindrical lens having a positive refractive power.

wherein the following condition is satisfied:

$$0.4 < f_2/f < 1$$

where f is a focal length of the entire lens system in a direction in which the lens system has refractive power and $f_2$ is a focal length of the second element in a direction in which the second element has refractive power.

16. A laser beam scanning apparatus comprising: a laser beam source;

a deflector including a reflecting surface for deflecting a laser beam emitted by the laser beam source;

a cylindrical lens system provided between the laser beam source and the deflector for converging a laser beam emitted by the laser beam source on the reflecting surface of the deflector, comprising:

a first element including a first cylindrical lens having a convex surface and a second cylindrical lens having a concave surface, the convex surface and the concave surface being arranged to be opposite to each other; and a second element including a third cylindrical lens; and a scanning optical system for directing a laser beam deflected by the deflector onto a scanned object.

17. A laser beam scanning apparatus as claimed in claim 16, wherein the third cylindrical lens is a convex cylindrical lens.

18. A laser beam scanning apparatus as claimed in claim 16, wherein, in the first cylindrical lens, a surface reverse to the convex surface is a flat surface.

19. A laser beam scanning apparatus as claimed in claim 16, wherein in the second cylindrical lens, a surface reverse to the concave surface is a flat surface.

20. A laser beam scanning apparatus as claimed in claim 16, one surface of the third cylindrical lens is a flat surface.

21. A laser beam scanning apparatus as claimed in claim 16, wherein the convex surface of the first cylindrical lens and the concave surface of the second cylindrical lens are cemented.

22. A laser beam scanning apparatus as claimed in claim 16, wherein one surface of the first element and one surface of the second element which surface is opposite to the one surface of the first element are cemented.

23. A laser beam scanning apparatus as claimed in claim 16, wherein the following condition is satisfied:

$$0.4 < f_2/f < 1$$

where f is a focal length of the entire cylindrical lens system in a direction in which the lens system has refractive power and $f_2$ is a focal length of the second element in a direction in which the second element has refractive power.

24. A laser beam scanning apparatus as claimed in claim 16, wherein the laser beam source includes a semiconductor laser and a collimator lens.

25. A laser beam scanning apparatus as claimed in claim 16, wherein the deflector includes a rotatable polygonal mirror.

26. A laser beam scanning apparatus as claimed in claim 16, wherein the reflecting surface of the deflector and the scanned object are arranged to be in a substantially conjugate relation with respect to the scanning optical system in a direction perpendicular to a scanning surface.

27. A laser beam scanning apparatus as claimed in claim 16, wherein the laser beam source includes semiconductor lasers which emit a plurality of laser beams having different wavelengths and compounding means for compounding into one laser beam the laser beams emitted by the semiconductor lasers.

* * * * *